United States Patent
Hsu

(10) Patent No.: US 10,774,210 B2
(45) Date of Patent: Sep. 15, 2020

(54) RESIN COMPOSITION AND ARTICLE MADE THEREFROM

(71) Applicant: Elite Material Co., Ltd., Taoyuan (TW)

(72) Inventor: Ching-Hsien Hsu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 37 days.

(21) Appl. No.: 16/359,060

(22) Filed: Mar. 20, 2019

(65) Prior Publication Data

US 2020/0263022 A1 Aug. 20, 2020

(30) Foreign Application Priority Data

Feb. 14, 2019 (TW) .............................. 108104902 A

(51) Int. Cl.
| | |
|---|---|
| *C08L 33/10* | (2006.01) |
| *C08L 33/08* | (2006.01) |
| *C08L 79/08* | (2006.01) |
| *C08K 5/00* | (2006.01) |
| *C08K 3/013* | (2018.01) |

(52) U.S. Cl.
CPC .............. *C08L 33/10* (2013.01); *C08K 3/013* (2018.01); *C08K 5/0025* (2013.01); *C08L 33/08* (2013.01); *C08L 79/08* (2013.01); *C08L 2201/02* (2013.01); *C08L 2203/16* (2013.01); *C08L 2203/206* (2013.01); *C08L 2312/08* (2013.01)

(58) Field of Classification Search
CPC .......... C08L 33/00; C08L 33/02; C08L 33/04; C08L 33/08; C08L 33/10; C08L 33/12; C08L 33/14; C08L 33/18; C08L 33/20; C08L 33/22; C09J 135/00; C09J 135/04; C08F 283/00; C08K 5/00; C08K 5/0025
See application file for complete search history.

(56) References Cited

U.S. PATENT DOCUMENTS

| | | | | |
|---|---|---|---|---|
| 4,373,086 A | * | 2/1983 | Ikeguchi | C08F 22/1006 528/322 |
| 4,503,186 A | * | 3/1985 | Sugio | C08F 283/08 525/391 |
| 5,529,728 A | * | 6/1996 | Buazza | B29C 33/0038 264/1.38 |
| 2013/0267672 A1 | * | 10/2013 | Yoshiwara | B32B 27/325 526/284 |

\* cited by examiner

*Primary Examiner* — Christopher M Rodd
(74) *Attorney, Agent, or Firm* — Muncy, Geissler, Olds & Lowe, P.C.

(57) ABSTRACT

Provided is a resin composition, which comprises 1 to 10 parts by weight of a bifunctional aliphatic long-chain acrylate and 30 to 50 parts by weight of a thermosetting resin. Moreover, an article is also provided, which is made from the resin composition described above. The article may comprise a prepreg, a resin film, a laminate or a printed circuit board.

10 Claims, No Drawings

RESIN COMPOSITION AND ARTICLE MADE THEREFROM

CROSS-REFERENCE TO RELATED APPLICATION

This application claims the priority benefits of Taiwan Patent Application No. 108104902, filed on Feb. 14, 2019. The entirety the above-mentioned patent application is hereby incorporated by reference herein and made a part of this specification.

BACKGROUND

1. Field of the Disclosure

The present disclosure relates to a resin composition and more particularly to a resin composition comprising a bifunctional aliphatic long-chain acrylate and a thermosetting resin and being useful for preparing an article such as a prepreg, a resin film, a laminate or a printed circuit board.

2. Description of Related Art

Conventionally cyanate ester resin and maleimide resin or maleimide triazine resin has been used to make circuit board materials with high dimensional stability; however, a copper-free laminate made from cyanate ester resin and maleimide resin or maleimide triazine resin generally has a Z-axis thermal expansion coefficient (alpha 1) of 45 ppm/° C. to 55 ppm/° C., which fails to meet the demand of a new generation higher dimensional stability (Z-axis thermal expansion coefficient (alpha 1) of less than 30 ppm/° C.) circuit board materials.

On the other hand, the peel strength between an insulation layer and a copper foil layer of a circuit board is another important property, and circuit boards with low peel strength tends to cause failure or malfunctioning due to peeling off of surface traces or short circuit after collision.

SUMMARY

Inventors of the present disclosure found that the addition of an acrylate to a resin composition may improve the peel strength between an insulation layer and a copper foil layer of a copper-clad laminate made from the resin composition. In addition, inventors of the present disclosure further found that, while the peel strength is increased, disadvantages such as lowered glass transition temperature, increased thermal expansion coefficient and increased thermal expansion ratio are also observed.

To further improve the properties of the resin material, particularly to solve one or more problems of currently available resin materials which fail to provide low dimensional change ratio, low thermal expansion coefficient, high glass transition temperature and low water absorption rate, it is a primary object of the present disclosure to provide a resin composition capable of solving the aforesaid technical problems and an article made from the resin composition.

In order to achieve the aforesaid object and other objects, the present disclosure provides a resin composition, comprising: 1 to 10 parts by weight of a bifunctional aliphatic long-chain acrylate; and 30 to 50 parts by weight of a thermosetting resin.

In one embodiment, the bifunctional aliphatic long-chain acrylate has a structure as shown below:

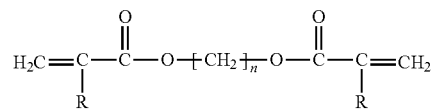

wherein n is an integer of greater than or equal to 5, and R is hydrogen or methyl group.

For example, n may be an integer of greater than or equal to 5 and less than or equal to 20, or preferably an integer of greater than or equal to 6 and less than or equal to 12.

In one embodiment, the bifunctional aliphatic long-chain acrylate has an n value of 6, 8, 10, 12, 14, 16, 18, or 20, but not limited thereto. Unless otherwise specified, in the present disclosure, "long-chain" refers to an n value of greater than or equal to 5.

In one embodiment, the thermosetting resin refers to a resin which is curable after being heated, such as but not limited to cyanate ester resin, maleimide resin, maleimide triazine resin or a combination thereof.

In one embodiment, the resin composition according to the present disclosure may further comprise epoxy resin, phenolic resin, benzoxazine resin, styrene maleic anhydride, polyester, amine curing agent, polyolefin, polyphenylene ether resin, triallyl isocyanurate, triallyl cyanurate, divinylbenzene, di(vinylbenzyl)ether, di(vinylphenyl) ethane, polyamide, polyimide or a combination thereof.

In one embodiment, the resin composition according to the present disclosure may further comprise flame retardant, inorganic filler, curing accelerator, solvent, toughening agent, silane coupling agent or a combination thereof.

The resin composition according to the present disclosure may be processed to make various articles, including but not limited to a prepreg, a resin film, a laminate or a printed circuit board. The above-mentioned articles have one or more of the following desirable properties: lower Z-axis thermal expansion coefficient, higher glass transition temperature, lower Z-axis dimensional change ratio and lower water absorption rate.

Specifically, the present disclosure provides a resin composition, characterized by comprising 1 to 10 parts by weight of a bifunctional aliphatic long-chain acrylate and 30 to 50 parts by weight of a thermosetting resin. Compared with resin compositions using different components or having different ratios (e.g., using bifunctional aliphatic non-long-chain acrylate, using monofunctional acrylate, using monofunctional aliphatic long-chain acrylate, etc.), the resin composition of the present disclosure or articles made therefrom have one, more or all of the following features:

1. having a Z-axis thermal expansion coefficient as measured by using a thermomechanical analyzer by reference to IPC-TM-650 2.4.24.5 of less than or equal to 30 ppm/° C.;
2. having a glass transition temperature as measured by using a thermomechanical analyzer by reference to IPC-TM-650 2.4.24.5 of greater than or equal to 208° C.;
3. having a glass transition temperature as measured by using a dynamic mechanical analyzer by reference to IPC-TM-650 2.4.24.4 of greater than or equal to 240° C.;
4. having a Z-axis dimensional change ratio as measured by using a thermomechanical analyzer by reference to IPC-TM-650 2.4.24.5 of less than or equal to 1.60%; and 5. having a water absorption rate of less than or equal to 0.30%.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition, comprising 1 to 10 parts by weight of a bifunctional aliphatic long-chain acrylate and 30 to 50 parts by weight of a thermosetting resin.

Unless otherwise specified, the bifunctional aliphatic long-chain acrylate refers to a bifunctional acrylate having an aliphatic long chain of 5 or more carbon atoms.

In one embodiment, the bifunctional aliphatic long-chain acrylate has a structure as shown below:

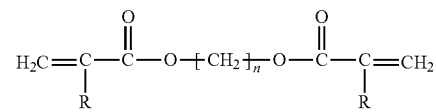

wherein n is an integer of greater than or equal to 5, and R is hydrogen or methyl group.

For example, n may be an integer of greater than or equal to 5 and less than or equal to 20, or preferably an integer of greater than or equal to 6 and less than or equal to 12.

In one embodiment, the bifunctional aliphatic long-chain acrylate has an n value of 6, 8, 10, 12, 14, 16, 18, or 20, but not limited thereto. Unless otherwise specified, in the present disclosure, "long-chain" refers to an n value of greater than or equal to 5, and "bifunctional" refers to the presence of two acrylate groups.

Specifically, the aforesaid bifunctional aliphatic long-chain acrylate may be any one of the compounds shown by Formula (I) to (III) or a combination thereof:

Formula (I)

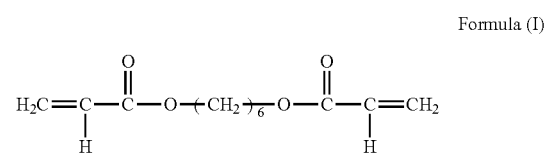

Formula (II)

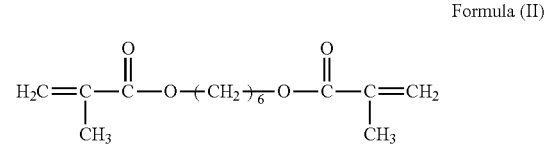

-continued

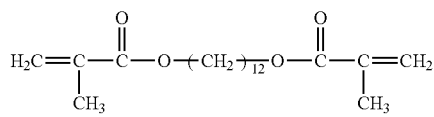

Formula (III)

For example, the bifunctional aliphatic long-chain acrylate of the present disclosure may comprise, but not limited to, 1,6-hexanediol diacrylate, 1,6-hexanediol dimethacrylate, 1,12-dodecanediol dimethacrylate or a combination thereof.

For example, the bifunctional aliphatic long-chain acrylate of the present disclosure may be a bifunctional aliphatic long-chain acrylate sold by Sartomer under the trade names SR-238NS, SR-239 and/or SR-262.

In the present disclosure, the thermosetting resin used is not particularly limited and may comprise cyanate ester resin, maleimide resin, maleimide triazine resin or a combination thereof.

For example, the cyanate ester resin is not particularly limited and may be any compound with an Ar—O—C≡N structure, wherein Ar represents a substituted or unsubstituted aromatic group, novolac, bisphenol A, bisphenol A novolac, bisphenol F, bisphenol F novolac or phenolphthalein. The cyanate ester resin may be available under the trade names Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza, but not limited thereto.

For example, the maleimide resin refers to a compound, monomer, mixture, or polymer (including oligomer) containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl) hexane, N-2,3-xylylmaleimide, N-2,6-xylenemaleimide, N-phenyl maleimide, maleimide compound containing aliphatic long-chain structure or a combination thereof. In addition, unless otherwise specified, the aforesaid maleimide resin may comprise a prepolymer thereof, such as a prepolymer of diallyl compound and maleimide compound, a prepolymer of diamine compound and maleimide compound, a prepolymer of multi-functional amine compound and maleimide compound or a prepolymer of acid phenol compound and maleimide compound, but not limited thereto.

For example, the maleimide resin used herein may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., or products such as BMI-70 and BMI-80 available from K.I Chemical Industry Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 sold by Designer Molecules Inc.

For example, unless otherwise specified, the maleimide triazine resin used in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester and maleimide, by polymerizing bisphenol F cyanate ester and maleimide, by polymerizing phenol novolac cyanate ester and maleimide or by polymerizing dicyclopentadiene-containing cyanate ester and maleimide, but not limited thereto.

For example, the maleimide triazine resin may be obtained by polymerizing the cyanate ester resin and the maleimide resin at any molar ratio. For example, relative to 1 mole of the maleimide resin, 1 to 10 moles of the cyanate ester may be used. For example, relative to 1 mole of the maleimide resin, 1, 2, 4, or 6 moles of the cyanate ester may be used, but not limited thereto.

In addition to the aforesaid components, the resin composition according to the present disclosure may further optionally comprise epoxy resin, phenolic resin, benzoxazine resin, styrene maleic anhydride, polyester, amine curing agent, polyolefin, polyphenylene ether resin, triallyl isocyanurate, triallyl cyanurate, divinylbenzene, di(vinylbenzyl)ether, di(vinylphenyl)ethane, polyamide, polyimide or a combination thereof.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof, but not limited thereto.

The novolac epoxy resin may comprise phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin.

The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin. The DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the phenolic resin may be any phenolic resins known in the field to which this disclosure pertains, including but not limited to phenoxy resin or novolac resin (such as phenol novolac resin, naphthol novolac resin, biphenyl novolac resin, and dicyclopentadiene phenol resin), but not limited thereto.

For example, the benzoxazine resin may be any benzoxazine resins known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, dianiline benzoxazine resin and phenyl-modified, vinyl-modified or allyl-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) and KZH-5032 (phenyl-modified benzoxazine resin) available from Kolon Industries Inc. The dianiline benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

For example, the styrene maleic anhydride may be any styrene maleic anhydrides known in the field to which this disclosure pertains, wherein the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

For example, the polyester may be any polyesters known in the field to which this disclosure pertains. Examples of the polyester include but are not limited to a dicyclopentadiene-containing polyester and a naphthalene-containing polyester. Examples include, but are not limited to, HPC-8000 or HPC-8150 available from D.I.C. Corporation.

For example, the amine curing agent may be any amine curing agents known in the field to which this disclosure pertains. Examples include but are not limited to any one or a combination of diamino diphenyl sulfone, diamino diphenyl methane, diamino diphenyl ether, diamino diphenyl sulfide and dicyandiamide.

For example, the polyolefin may be any polyolefins known in the field to which this disclosure pertains, examples including but not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), maleic anhydride-butadiene copolymer, methyl styrene copolymer or a combination thereof.

For example, the polyphenylene ether resin may be any polyphenylene ether resins known in the field to which this disclosure pertains, examples including but not limited to hydroxyl-containing polyphenylene ether resin and vinyl-containing polyphenylene ether resin. The vinyl-containing polyphenylene ether resin is a vinyl-terminated polyphenylene ether resin. Examples include but are not limited to vinylbenzyl-terminated polyphenylene ether resin (e.g., OPE-2st available from Mitsubishi Gas Chemical Co., Inc.), methacrylate-terminated polyphenylene ether resin (e.g., SA-9000 available from Sabic), vinylbenzyl-modified bisphenol A polyphenylene ether resin, vinyl-containing chain-extended polyphenylene ether resin or a combination thereof.

In addition to the aforesaid components, the resin composition of the present disclosure may further optionally comprise flame retardant, inorganic filler, curing accelerator, solvent, toughening agent, silane coupling agent or a combination thereof.

For example, the flame retardant may be any flame retardants known in the field to which this disclosure pertains, examples including but not limited to any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate and aluminium phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

For example, relative to a total of 1 to 10 parts by weight of the bifunctional aliphatic long-chain acrylate and 30 to 50 parts by weight of the thermosetting resin, the amount of the flame retardant used in the present disclosure is not particularly limited, and may range from 1 to 100 parts by weight, such as 10 to 90 parts by weight, 20 to 80 parts by weight, 30 to 70 parts by weight, or 40 to 60 parts by weight.

For example, the inorganic filler may be any inorganic fillers known in the field to which this disclosure pertains, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin or a combination thereof. Moreover, the inorganic filler can be spherical, fibrous, plate-like, particulate, sheet-like or whisker-like in shape and can be optionally pretreated by a silane coupling agent.

For example, the curing accelerator (including curing initiator) may be any curing accelerators known in the field to which this disclosure pertains. Examples include but are not limited to catalysts such as a Lewis base, a Lewis acid or a combination thereof. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the toughening agent may comprise, but not limited to, rubber resin, carboxyl-terminated butadiene acrylonitrile rubber (CTBN rubber), core-shell rubber, or a combination thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

Another object of the present disclosure is to provide an article made from the aforesaid resin composition, such as a prepreg, a resin film, a laminate or a printed circuit board, but not limited thereto.

The article made from the resin composition may be a prepreg, which comprises a reinforcement material and a layered structure disposed thereon. The layered structure is formed by heating the resin composition at a high temperature to a semi-cured state (B-stage). Suitable baking temperature for making the prepreg may be for example 80° C. to 170° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a resin film prepared by heating and baking to semi-cure the resin composition. The resin composition may be selectively coated on a polyethylene terephthalate film (PET film), a polyimide film (PI film), a copper foil or a resin-coated copper (RCC), followed by heating and baking to semi-cure the resin composition to form the resin film.

The article made from the resin composition may be a laminate, which comprises two metal foils and an insulation layer disposed between the metal foils, wherein the insulation layer is made by curing the resin composition at high temperature and high pressure to the C-stage, a suitable curing temperature being for example between 150° C. and 220° C. and preferably between 190° C. and 210° C. and a suitable curing time being 90 to 180 minutes and preferably 120 to 150 minutes. The insulation layer may be obtained by curing the aforesaid prepreg or resin film. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a circuit board (e.g., printed circuit board).

Specifically, the resin composition disclosed herein or articles made therefrom have one, more or all of the following properties:

1. a Z-axis thermal expansion coefficient as measured by using a thermomechanical analyzer by reference to IPC-TM-650 2.4.24.5 of less than or equal to 30 ppm/° C., such as between 25.2 ppm/° C. and 28.6 ppm/° C.;
2. a glass transition temperature as measured by using a thermomechanical analyzer by reference to IPC-TM-650 2.4.24.5 of greater than or equal to 208° C., such as between 208° C. and 220° C.;
3. a glass transition temperature as measured by using a dynamic mechanical analyzer by reference to IPC-TM-650 2.4.24.4 of greater than or equal to 240° C., such as between 240° C. and 256° C.;
4. a Z-axis dimensional change ratio as measured by using a thermomechanical analyzer by reference to IPC-TM-650 2.4.24.5 of less than or equal to 1.60%, such as between 1.29% and 1.52%; and
5. a water absorption rate of less than or equal to 0.30%, such as between 0.22% and 0.30%.

Materials and reagents used in Preparation Examples, Examples and Comparative Examples disclosed herein are listed below:

PT-30S: phenol novolac type cyanate ester, available from Lonza.

BA-230S: bisphenol A type cyanate ester, available from Lonza.

BMI-70: bis(3-ethyl-5-methyl-4-maleimidephenyl) methane, available from K.I Chemical Industry Co., Ltd.

BMI-2300: polyphenylmethane maleimide, available from Daiwakasei Industry Co., Ltd.

BT resin 1: obtained by polymerizing PT-30S and BMI-70 at a molar ratio of 2:1, prepared by Applicant according to conventional processes.

BT resin 2: obtained by polymerizing PT-30S and BMI-70 at a molar ratio of 4:1, prepared by Applicant according to conventional processes.

BT resin 3: obtained by polymerizing PT-30S and BMI-2300 at a molar ratio of 2:1, prepared by Applicant according to conventional processes.

BT resin 4: obtained by polymerizing BA-230S and BMI-70 at a molar ratio of 2:1, prepared by Applicant according to conventional processes.

SR-238NS: 1,6-hexanediol diacrylate, as illustrated by Formula (I), available from Sartomer.

SR-239: 1,6-hexanediol dimethacrylate, as illustrated by Formula (II), available from Sartomer.

SR-262: 1,12-dodecanediol dimethacrylate, as illustrated by Formula (III), available from Sartomer.

SR-833: tricyclodecane dimethanol diacrylate, available from Sartomer.

SR-349: ethoxylated bisphenol A diacrylate, available from Sartomer.

SR-231: diethylene glycol dimethacrylate, available from Sartomer.

SR-297: 1,3-butylene glycol dimethacrylate, available from Sartomer.

SR-423NS: isobornyl methacrylate, available from Sartomer.

SR-313: dodecyl methacrylate, available from Sartomer.

SR-324: octadecyl methacrylate, available from Sartomer.
B-1000: polybutadiene, available from Nippon Soda Co., Ltd.
OPE-2St: vinylbenzyl-terminated polyphenylene ether, available from Mitsubishi Gas Chemical Co., Inc.
25B: peroxide, available from NOF Corporation.
SC-2500: spherical silica, available from Admatechs.
Toluene and methyl ethyl ketone are commercially available.

Samples (specimens) were prepared as described below and tested and analyzed under specified conditions below.

Prepreg

Resin compositions from different Examples (E1 to E15) and Comparative Examples (C1 to C12) listed in Table 1 to Table 4 were respectively added to a stirred tank, well mixed and fully dissolved as varnishes and then added to an impregnation tank. A fiberglass fabric (e.g., 2116 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Copper-Clad Laminate (Obtained by Laminating Eight Prepregs)

Two 18 μm reverse treatment copper foils (RTFs) and eight prepregs made from each resin composition (using 2116 E-glass fiber fabrics) were prepared. Each prepreg has a resin content of about 52%. A copper foil, eight prepregs and a copper foil were superimposed in such order and then subject to a vacuum condition for lamination at 200° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate was etched to remove the two copper foils to obtain a copper-free laminate made from laminating eight prepregs, and each copper-free laminate had a resin content of about 52%.

Test items and test methods are described below.

Glass Transition Temperature (TMA Tg)

A copper-free laminate (obtained by laminating eight prepregs) sample was subject to glass transition temperature measurement by using the thermal mechanical analysis (TMA) method. Each sample was heated from 50° C. to 260° C. at a heating rate of 10° C./minute and then subject to the measurement of glass transition temperature (° C.) by reference to the method described in IPC-TM-650 2.4.24.5, wherein higher glass transition temperature is more preferred.

Glass Transition Temperature (DMA Tg)

A copper-free laminate (obtained by laminating eight prepregs) sample was subject to glass transition temperature measurement by using the dynamic mechanical analysis (DMA) method. Each sample was heated from 35° C. to 300° C. at a heating rate of 2° C./minute and then subject to the measurement of glass transition temperature (° C.) by reference to the method described in IPC-TM-650 2.4.24.4, wherein higher glass transition temperature is more preferred.

Dimensional Change Ratio (or Ratio of Dimensional Change)

A copper-free laminate (obtained by laminating eight prepregs) sample was subject to thermal mechanical analysis (TMA) during measurement of dimensional change ratio (a.k.a. ratio of thermal expansion). Each sample was heated from 50° C. to 260° C. at a heating rate of 10° C./minute and then subject to the measurement of dimensional change (%) between 50° C. and 260° C. in Z-axis by reference to the method described in IPC-TM-650 2.4.24.5, wherein lower dimensional change percentage is more preferred, and a difference in dimensional change ratio of greater than or equal to 0.1% represents significant difference.

Thermal Expansion Coefficient (or Coefficient of Thermal Expansion, CTE)

A Copper-Free Laminate (Obtained by Laminating Eight Prepregs) Sample was subject to the measurement of thermal expansion coefficient (Z-axis). In a temperature range from 50° C. to 260° C., a thermomechanical analyzer was used for the measurement of thermal expansion coefficient (alpha 1 in Z-axis, 50-110° C. temperature range, unit: ppm/° C.) of each sample by reference to IPC-TM-650 2.4.24.5. Lower thermal expansion coefficient represents lower expansion of the sample under heat, indicating the resin composition may have a better property when being used for a printed circuit board. Lower thermal expansion coefficient is more preferred; in general, a difference of 0.5 ppm/° C. in the thermal expansion coefficient represents a significant difference.

Water Absorption Rate

In the measurement of water absorption rate, a copper-free laminate (obtained by laminating eight prepregs) sample was cut to a size of 2*2 inch and laid on an aluminum tray and placed into a 105° C. oven for baking for 1 hour; after that, the sample was removed from the oven and placed in a desiccator and cooled to room temperature (about 25° C.), and then the weight of the cooled sample was measured, which is designated as W1. The sample was completely immersed in the water contained in a flask and stood still at room temperature for 24 hours; after that, the sample was removed from the flask and wiped to remove water on the surface; then the weight of the sample was measured, which is designated as W2. Water absorption rate W (%) was calculated as follow:

$$W (\%)=((W2-W1)/W1)*100\%.$$

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 | E6 | E7 | E8 |
|---|---|---|---|---|---|---|---|---|---|
| cyanate ester | PT-30S | 10 | 10 | 10 | | | | | 20 |
| | BA-230S | | | | | | | | |
| maleimide resin | BMI-70 | 20 | 20 | 20 | 15 | 15 | 15 | 15 | 20 |
| BT resin | BT resin 1 | | | | 15 | 30 | | | |
| | BT resin 2 | | | | | | | 15 | |

TABLE 1-continued

Resin compositions of Examples (in part by weight) and test results

|  |  | | | | | | | | |
|---|---|---|---|---|---|---|---|---|---|
|  | BT resin 3 |  |  |  |  |  |  | 15 |  |
|  | BT resin 4 |  |  |  |  |  |  |  |  |
| bifunctional aliphatic long-chain acrylate | SR-238NS | 5 | 1 | 10 | 5 | 5 | 5 | 5 | 5 |
|  | SR-239 |  |  |  |  |  |  |  |  |
|  | SR-262 |  |  |  |  |  |  |  |  |
| polybutadiene | B-1000 | 4 | 4 | 4 | 4 | 4 | 4 | 4 | 4 |
| vinylbenzyl-terminated polyphenylene ether | OPE-2St | 30 | 30 | 30 | 30 | 30 | 30 | 30 | 30 |
| peroxide | 25B | 0.5 | 0.5 | 0.5 | 0.5 | 0.5 | 0.5 | 0.5 | 0.5 |
| spherical silica | SC-2500 | 70 | 70 | 70 | 70 | 70 | 70 | 70 | 70 |
| toluene |  | 25 | 25 | 25 | 25 | 25 | 25 | 25 | 25 |
| methyl ethyl ketone |  | 50 | 50 | 50 | 50 | 50 | 50 | 50 | 50 |

| Property | Unit | E1 | E2 | E3 | E4 | E5 | E6 | E7 | E8 |
|---|---|---|---|---|---|---|---|---|---|
| Tg (TMA) | (° C.) | 215 | 210 | 215 | 219 | 217 | 218 | 218 | 219 |
| Tg (DMA) | (° C.) | 250 | 246 | 248 | 252 | 254 | 253 | 251 | 253 |
| dimensional change ratio | (%) | 1.32 | 1.48 | 1.45 | 1.36 | 1.32 | 1.37 | 1.52 | 1.29 |
| thermal expansion coefficient | (ppm/° C.) | 26.1 | 28.6 | 28.3 | 26.2 | 26.0 | 26.6 | 28.6 | 25.4 |
| water absorption rate | (%) | 0.23 | 0.27 | 0.26 | 0.23 | 0.22 | 0.26 | 0.27 | 0.26 |

TABLE 2

Resin compositions of Examples (in part by weight) and test results

| Component | Name | E9 | E10 | E11 | E12 | E13 | E14 | E15 |
|---|---|---|---|---|---|---|---|---|
| cyanate ester | PT-30S | 10 | 10 | 10 | 20 |  |  | 20 |
|  | BA-230S |  |  |  |  | 10 |  |  |
| maleimide resin | BMI-70 | 30 | 20 | 20 | 30 | 20 | 15 | 30 |
| BT resin | BT resin 1 |  |  |  |  |  |  |  |
|  | BT resin 2 |  |  |  |  |  |  |  |
|  | BT resin 3 |  |  |  |  |  |  |  |
|  | BT resin 4 |  |  |  |  |  | 15 |  |
| bifunctional aliphatic long-chain acrylate | SR-238NS | 5 |  |  | 6 | 5 | 5 | 3 |
|  | SR-239 |  | 5 |  |  |  |  |  |
|  | SR-262 |  |  | 5 |  |  |  |  |
| polybutadiene | B-1000 | 4 | 4 | 4 | 2 | 4 | 4 | 8 |
| vinylbenzyl-terminated polyphenylene ether | OPE-2St | 30 | 30 | 30 | 30 | 30 | 30 | 50 |
| peroxide | 25B | 0.5 | 0.5 | 0.5 | 0.5 | 0.5 | 0.5 | 0.5 |
| spherical silica | SC-2500 | 70 | 70 | 70 | 70 | 70 | 70 | 70 |
| toluene |  | 25 | 25 | 25 | 25 | 25 | 25 | 25 |
| methyl ethyl ketone |  | 50 | 50 | 50 | 50 | 50 | 50 | 50 |

| Property | Unit | E9 | E10 | E11 | E12 | E13 | E14 | E15 |
|---|---|---|---|---|---|---|---|---|
| Tg (TMA) | (° C.) | 217 | 216 | 212 | 220 | 212 | 208 | 214 |
| Tg (DMA) | (° C.) | 255 | 247 | 245 | 256 | 240 | 243 | 242 |
| dimensional change ratio | (%) | 1.30 | 1.38 | 1.42 | 1.31 | 1.46 | 1.52 | 1.45 |

TABLE 2-continued

Resin compositions of Examples (in part by weight) and test results

| thermal expansion coefficient | (ppm/°C.) | 25.8 | 26.8 | 27.2 | 25.2 | 26.8 | 26.9 | 26.2 |
| water absorption rate | (%) | 0.22 | 0.25 | 0.27 | 0.22 | 0.30 | 0.27 | 0.25 |

TABLE 3

Resin compositions of Comparative Examples (in part by weight) and test results

| Component | Name | C1 | C2 | C3 | C4 | C5 | C6 |
|---|---|---|---|---|---|---|---|
| cyanate ester | PT-30S | 10 | 10 | 10 | 10 | 10 | 10 |
|  | BA-230S |  |  |  |  |  |  |
| maleimide resin | BMI-70 | 20 | 20 | 20 | 20 | 20 | 20 |
| bifunctional aliphatic long-chain acrylate | SR-238NS | 0.5 | 20 |  |  |  |  |
|  | SR-239 |  |  |  |  |  |  |
|  | SR-262 |  |  |  |  |  |  |
| bifunctional aliphatic non-long-chain acrylate | SR-833 |  |  | 5 |  |  |  |
|  | SR-349 |  |  |  | 5 |  |  |
|  | SR-231 |  |  |  |  |  | 5 |
|  | SR-297 |  |  |  |  |  |  |
| monofunctional acrylate | SR-423NS |  |  |  |  | 5 |  |
| monofunctional aliphatic long-chain acrylate | SR-313 |  |  |  |  |  |  |
|  | SR-324 |  |  |  |  |  |  |
| polybutadiene | B-1000 | 4 | 4 | 4 | 4 | 4 | 4 |
| vinylbenzyl-terminated polyphenylene ether | OPE-2St | 30 | 30 | 30 | 30 | 30 | 30 |
| peroxide | 25B | 0.5 | 0.5 | 0.5 | 0.5 | 0.5 | 0.5 |
| spherical silica | SC-2500 | 70 | 70 | 70 | 70 | 70 | 70 |
| toluene |  | 25 | 25 | 25 | 25 | 25 | 25 |
| methyl ethyl ketone |  | 50 | 50 | 50 | 50 | 50 | 50 |

| Property | Unit | C1 | C2 | C3 | C4 | C5 | C6 |
|---|---|---|---|---|---|---|---|
| Tg (TMA) | (°C.) | 208 | 198 | 202 | 204 | 208 | 200 |
| Tg (DMA) | (°C.) | 245 | 232 | 236 | 240 | 239 | 235 |
| dimensional change ratio | (%) | 1.52 | 1.82 | 1.76 | 1.72 | 1.65 | 1.68 |
| thermal expansion coefficient | (ppm/°C.) | 30.3 | 32.3 | 33.4 | 34.2 | 32.6 | 31.6 |
| water absorption rate | (%) | 0.31 | 0.23 | 0.33 | 0.32 | 0.29 | 0.35 |

TABLE 4

Resin compositions of Comparative Examples (in part by weight) and test results

| Component | Name | C7 | C8 | C9 | C10 | C11 | C12 |
|---|---|---|---|---|---|---|---|
| cyanate ester | PT-30S | 10 | 10 | 10 | 10 | 10 | 10 |
|  | BA-230S |  |  |  |  |  |  |
| maleimide resin | BMI-70 | 20 | 20 | 20 | 20 | 20 | 20 |
| bifunctional aliphatic non-long-chain acrylate | SR-833 |  |  |  | 5 | 5 | 10 |
|  | SR-349 |  |  |  |  |  |  |
|  | SR-231 |  |  |  |  |  |  |
|  | SR-297 | 5 |  |  |  |  |  |
| monofunctional acrylate | SR-423NS |  |  |  |  | 5 |  |
| monofunctional aliphatic long-chain acrylate | SR-313 |  | 5 |  | 5 |  |  |
|  | SR-324 |  |  | 5 |  |  |  |

TABLE 4-continued

Resin compositions of Comparative Examples (in part by weight) and test results

| | | | | | | | |
|---|---|---|---|---|---|---|---|
| polybutadiene | B-1000 | 4 | 4 | 4 | 4 | 4 | 4 |
| vinylbenzyl-terminated polyphenylene ether | OPE-2St | 30 | 30 | 30 | 30 | 30 | 30 |
| peroxide | 25B | 0.5 | 0.5 | 0.5 | 0.5 | 0.5 | 0.5 |
| spherical silica | SC-2500 | 70 | 70 | 70 | 70 | 70 | 70 |
| toluene | | 25 | 25 | 25 | 25 | 25 | 25 |
| methyl ethyl ketone | | 50 | 50 | 50 | 50 | 50 | 50 |

| Property | Unit | C7 | C8 | C9 | C10 | C1 | C12 |
|---|---|---|---|---|---|---|---|
| Tg (TMA) | (° C.) | 204 | 206 | 202 | 200 | 203 | 198 |
| Tg (DMA) | (° C.) | 236 | 240 | 239 | 232 | 235 | 228 |
| dimensional change ratio | (%) | 1.62 | 1.76 | 1.83 | 1.82 | 1.78 | 2.06 |
| thermal expansion coefficient | (ppm/° C.) | 31.1 | 33.6 | 34.2 | 34.6 | 33.5 | 35.8 |
| water absorption rate | (%) | 0.36 | 0.34 | 0.38 | 0.35 | 0.33 | 0.34 |

The following observations can be made according to the test results above.

Compared with Comparative Examples C1-C2, Examples E1-E3 contains 1 to 10 parts by weight of the bifunctional aliphatic long-chain acrylate and therefore achieves better (higher) TMA Tg and DMA Tg and better (lower) thermal expansion coefficient (Z-axis thermal expansion coefficient of less than or equal to 30 ppm/° C.). In contrast, Comparative Examples C1-C2 contains the bifunctional aliphatic long-chain acrylate not within the range of 1 to 10 parts by weight, which results in lower glass transition temperature and worse thermal expansion coefficient.

Compared with Comparative Examples C3-C12, Examples E1-E3, E8-E13 and E15 demonstrate one, more or all of the following features: TMA Tg of greater than or equal to 208° C., DMA Tg of greater than or equal to 240° C., Z-axis dimensional change ratio of less than or equal to 1.60%, Z-axis thermal expansion coefficient of less than or equal to 30 ppm/° C., and water absorption rate of less than or equal to 0.30%. In contrast, Comparative Examples C3-C12 fail to achieve the above-mentioned features.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   1 to 10 parts by weight of a bifunctional aliphatic long-chain acrylate; and
   30 to 50 parts by weight of a thermosetting resin;
   wherein the thermosetting resin comprises cyanate ester resin, maleimide resin, maleimide triazine resin or a combination thereof;
   wherein the maleimide triazine resin is a polymer of cyanate ester resin and maleimide resin; and
   wherein an article made from the resin composition has a Z-axis dimensional change ratio as measured by using a thermomechanical analyzer by reference to IPC-TM-650 2.4.24.5 of less than or equal to 1.60%.

2. The resin composition of claim 1, wherein the bifunctional aliphatic long-chain acrylate has a structure as shown below:

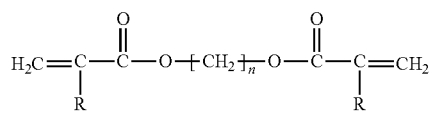

wherein n is an integer of greater than or equal to 5, and R is hydrogen or methyl group.

3. The resin composition of claim 2, wherein n ranges from 6 to 12.

4. The resin composition of claim 1, further comprising epoxy resin, phenolic resin, benzoxazine resin, styrene maleic anhydride, polyester, amine curing agent, polyolefin, polyphenylene ether resin, triallyl isocyanurate, triallyl cyanurate, divinylbenzene, di(vinylbenzyl)ether, di(vinylphenyl)ethane, polyamide, polyimide or a combination thereof.

5. The resin composition of claim 1, further comprising flame retardant, inorganic filler, curing accelerator, solvent, toughening agent, silane coupling agent or a combination thereof.

6. An article made from the resin composition of claim 1, comprising a prepreg, a resin film, a laminate or a printed circuit board.

7. The article of claim 6, having a Z-axis thermal expansion coefficient as measured by using a thermomechanical analyzer by reference to IPC-TM-650 2.4.24.5 of less than or equal to 30 ppm/° C.

8. The article of claim 6, having a glass transition temperature as measured by using a thermomechanical analyzer by reference to IPC-TM-650 2.4.24.5 of greater than or equal to 208° C.

9. The article of claim 6, having a glass transition temperature as measured by using a dynamic mechanical analyzer by reference to IPC-TM-650 2.4.24.4 of greater than or equal to 240° C.

10. The article of claim 6, having a water absorption rate of less than or equal to 0.30%.

\* \* \* \* \*